(12) United States Patent
Oikawa et al.

(10) Patent No.: US 10,363,692 B2
(45) Date of Patent: Jul. 30, 2019

(54) METHOD FOR MANUFACTURING LIQUID SUPPLY MEMBER

(71) Applicant: CANON KABUSHIKI KAISHA, Tokyo (JP)

(72) Inventors: Satoshi Oikawa, Yokohama (JP); Yukuo Yamaguchi, Tokyo (JP); Mikiya Umeyama, Tokyo (JP); Hiromasa Amma, Kawasaki (JP); Takuya Iwano, Inagi (JP); Satoshi Kimura, Kawasaki (JP); Naoko Tsujiuchi, Kawasaki (JP); Yasushi Iijima, Tokyo (JP); Kyosuke Toda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 255 days.

(21) Appl. No.: 15/151,880

(22) Filed: May 11, 2016

(65) Prior Publication Data

US 2016/0346967 A1 Dec. 1, 2016

(30) Foreign Application Priority Data

May 25, 2015 (JP) .................................. 2015-105091

(51) Int. Cl.
*B29C 45/00* (2006.01)
*B29L 31/00* (2006.01)
(Continued)

(52) U.S. Cl.
CPC ........ *B29C 45/0062* (2013.01); *B29C 45/162* (2013.01); *B29C 45/1628* (2013.01);
(Continued)

(58) Field of Classification Search
CPC ................ B29C 45/0062; B29C 45/33; B29C 2045/0063; B29C 45/1628;
(Continued)

(56) References Cited

U.S. PATENT DOCUMENTS

| 5,464,578 A * | 11/1995 | Salter ...................... B29C 45/16 264/250 |
| 2010/0171798 A1* | 7/2010 | Yamaguchi .......... B41J 2/16532 347/85 |
| 2012/0306972 A1 | 12/2012 | Yokota et al. |

FOREIGN PATENT DOCUMENTS

| CN | 102814913 A | 12/2012 |
| JP | 2002079542 A * | 3/2002 ......... B29C 45/0062 |
| JP | 2002-178538 A | 6/2002 |

OTHER PUBLICATIONS

U.S. Appl. No. 15/156,583, filed May 17, 2016.
(Continued)

*Primary Examiner* — William P Bell
*Assistant Examiner* — Andrew L Swanson
(74) *Attorney, Agent, or Firm* — Venable LLP

(57) ABSTRACT

There is provided a manufacturing method for molding a liquid supply member by using a first mold and a second mold in which the first mold is capable of being slid relatively to the second mold, the method including a first molding step of performing injection molding to form a first and second component parts of the liquid supply member at different positions from each other, an evacuating step of sliding the formed second component part in a direction intersecting with a direction of sliding of the first mold relative to the second mold and with a direction of the opening and the closing the first and the second mold, a contacting step of bringing the formed second component part into contact with the molded first component part, and a second molding step of performing injection molding to join the first component part and the second component part.

10 Claims, 11 Drawing Sheets

(51) Int. Cl.
 *B29C 45/16* (2006.01)
 *B29C 45/33* (2006.01)
(52) U.S. Cl.
 CPC ...... *B29C 45/33* (2013.01); *B29C 2045/0063* (2013.01); *B29C 2045/1623* (2013.01); *B29C 2045/1629* (2013.01); *B29L 2031/7678* (2013.01)
(58) Field of Classification Search
 CPC .................. B29C 2015/1629–1632; B29C 45/162–2045/1623; B29C 45/1615; B29C 2043/503–5038; B29C 45/06–062; B29C 45/0003; B29C 45/04; B29C 45/0408; B29C 45/0416; B29C 45/006; B29C 2045/0068; B29L 2031/7678
 See application file for complete search history.

(56) References Cited

OTHER PUBLICATIONS

U.S. Appl. No. 15/156,649, filed May 17, 2016.
U.S. Appl. No. 15/157,909, filed May 18, 2016.
U.S. Appl. No. 15/156,578, filed May 17, 2016.
U.S. Appl. No. 15/156,569, filed May 17, 2016.
U.S. Appl. No. 15/157,890, filed May 18, 2016.
U.S. Appl. No. 15/156,559, filed May 17, 2016.
First Office Action in Chinese Application No. 201610346051.9 (dated May 17, 2018).

* cited by examiner

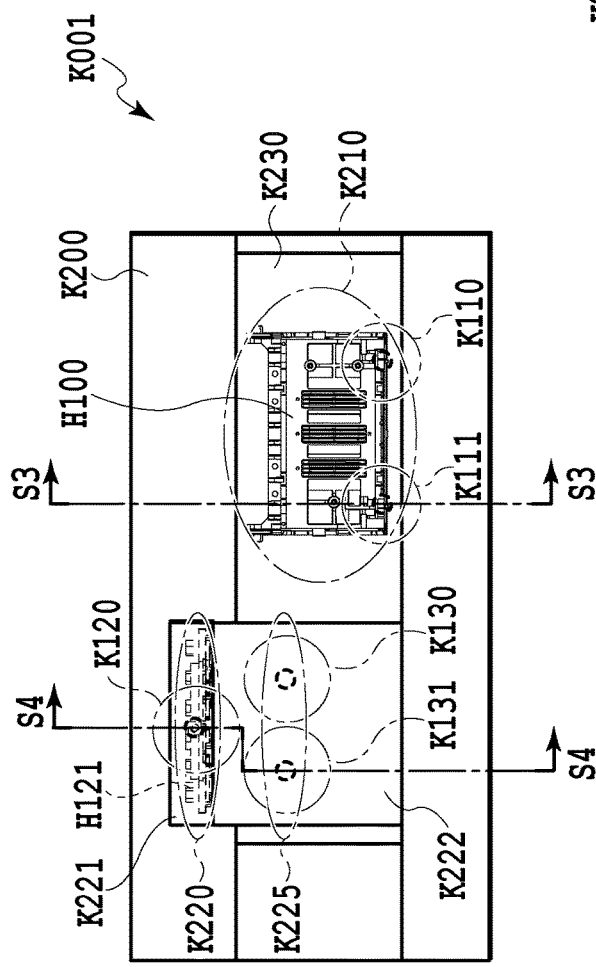
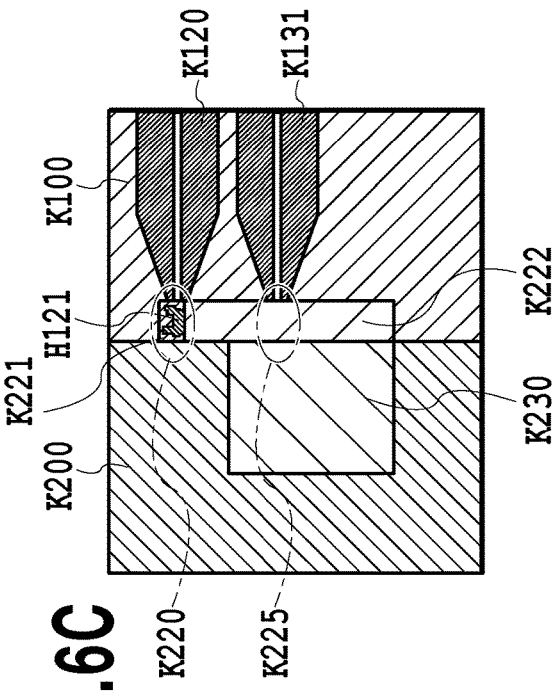
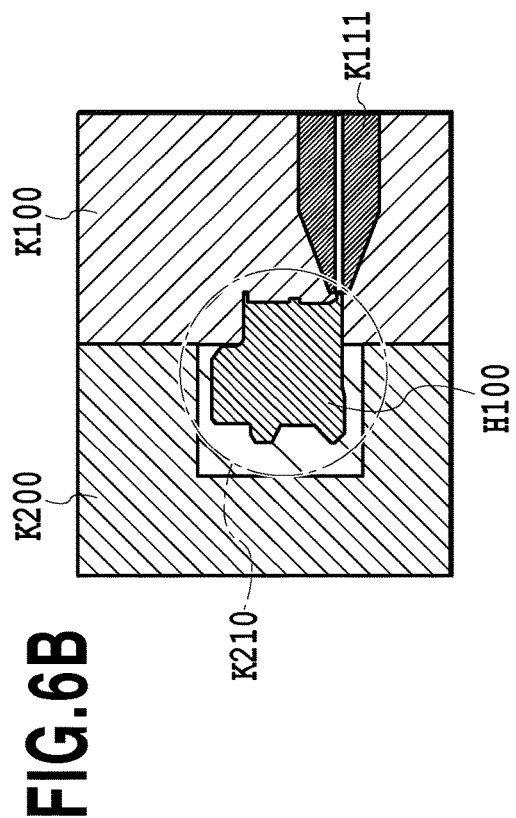
FIG.6A
FIG.6B
FIG.6C

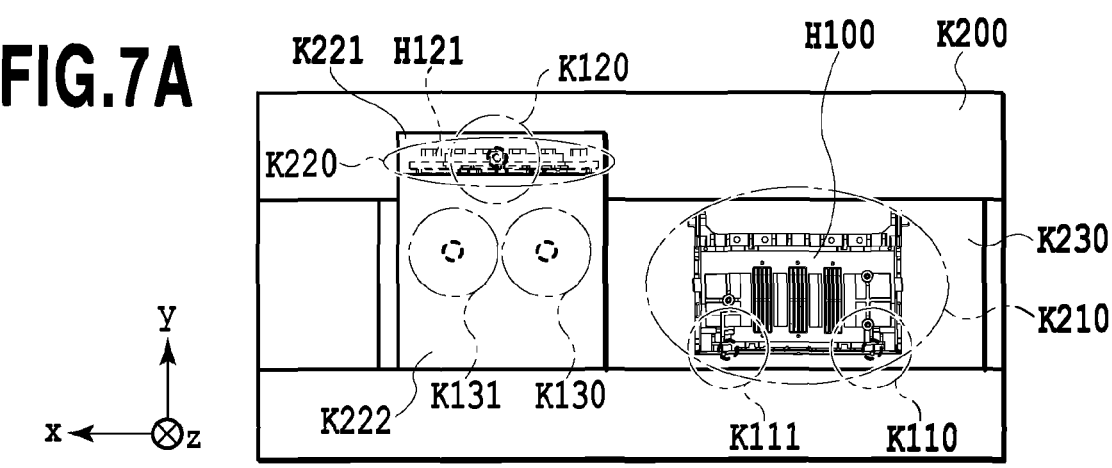
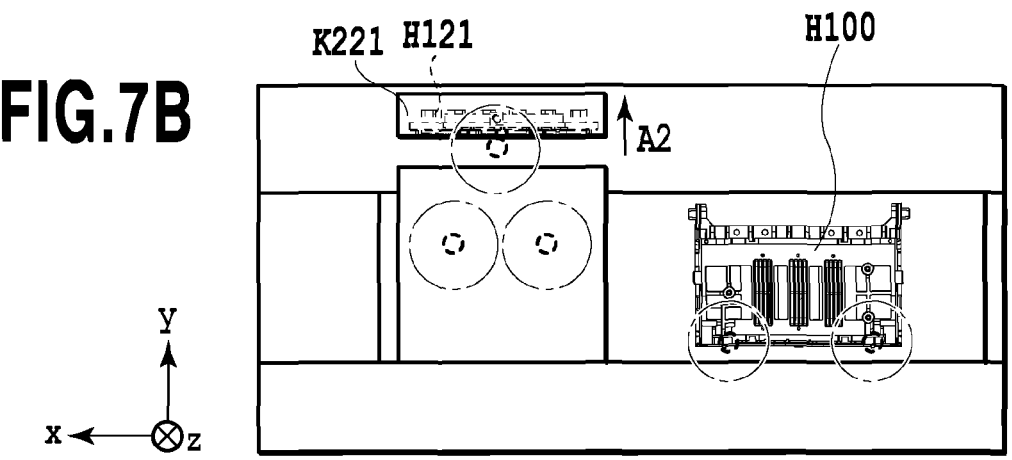
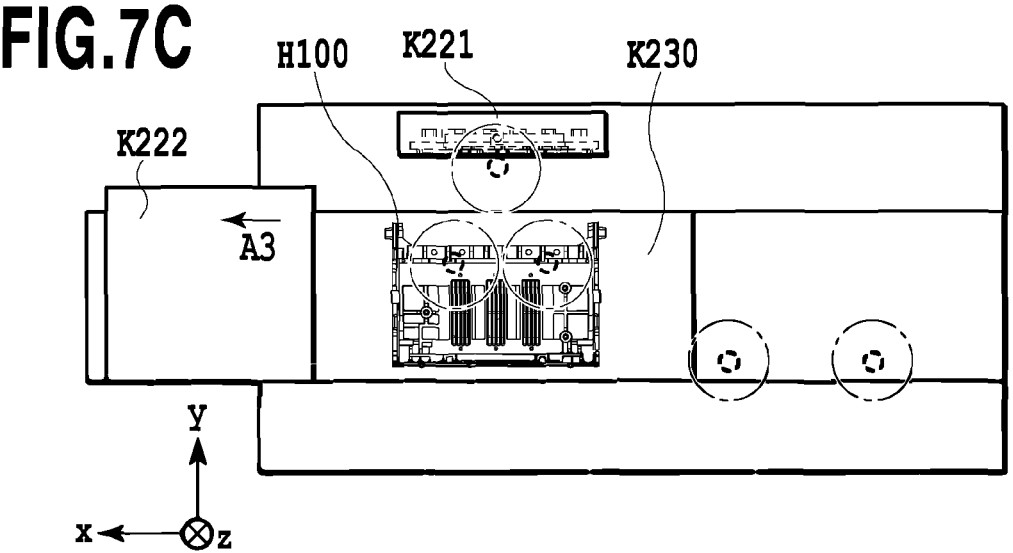

METHOD FOR MANUFACTURING LIQUID SUPPLY MEMBER

BACKGROUND OF THE INVENTION

Field of the Invention

The present invention relates to a method for manufacturing a liquid supply member for a liquid ejection apparatus, such as an inkjet printing apparatus, and more particularly, to a manufacturing method which molds and assembles a plurality of components of a liquid supply member in a mold.

Description of the Related Art

Japanese Patent Laid-Open No. 2002-178538 discloses this kind of manufacturing method. In the method, for example, two components forming a hollow body are formed at different positions in the same mold by injection molding (primary molding). After the mold is opened, one mold which holds one of the two components slides to a position where the two components come into contact with each other, relative to the other mold holding the other component. Then, the mold is closed so that the two components come into contact with each other to form the hollow body. In addition, a molten resin flows to a contact portion to join and seal the contact portion, thereby forming a sealed hollow component (secondary molding). According to this technique, it is possible to simply manufacture a liquid supply member.

However, the manufacturing method using a mold disclosed in Japanese Patent Laid-Open No. 2002-178538 has the problem that, when the contact portion between the two components is located at a deep position in one of the components, a mold opening stroke increases.

FIGS. 11A and 11B are diagrams illustrating a case in which two components 500 and 521 come into contact with each other at a shallow position and a case in which the two components H500 and H521 come into contact with each other at a deep position, respectively. In FIGS. 11A and 11B, a mold is not illustrated and only the two components are illustrated. Respective molds (not illustrated) which hold the components are opened upward and downward in FIGS. 11A and 11B. As illustrated in FIG. 11B, when the contact portion between the two components is located at a deep position in one of the two components, a mold opening stroke corresponding to a distance A9 that is greater than a distance A8 when the contact portion is located at a shallow position is required in order to open the molds and to slide the molds relative to each other.

As such, when the mold opening stroke is large, for example, the following problems also arise. When mass production is considered in injection molding, a hot runner system is generally used as an injection nozzle structure in order to prevent the manufacture of an unnecessary molded portion which is a defective product such as a runner portion. More specifically, the hot runner system allows a hot runner gate valve to be arranged closest to a molding product, and thus it is possible to perform molding such that a runner portion, which is unnecessary as a product after molding, is not formed. However, it is necessary to arrange a gate valve and a valve driving cylinder in the thickness direction of the mold for constructing the mold using the hot runner system, which results in an increase in the thickness of the mold. In addition, when the extraction of a molded product is automated, the work space of a robot for extracting the molded product is required as a mold opening space. From these points, when the mold opening stoke is relatively large, a large mold attachment space is required in the molding machine used. That is, the sizes of a mold and a molding machine and costs increase.

SUMMARY OF THE INVENTION

An object of the invention is to provide a liquid supply member manufacturing method which can suppress an increase in the size of a mold or a molding machine even in a molding process using a mold in which a contact portion between two components is located at a deep position in one of the two components.

In a first aspect of the present invention, there is provided a manufacturing method for molding a liquid supply member by using a first mold and a second mold which are capable of opened and closed relative to each other and in which the first mold is capable of being slid relatively to the second mold, the method comprising: a first molding step of performing injection molding to form a first component part of the liquid supply member and a second component part of the liquid supply member other than the first component part at different positions from each other, with the first and the second mold closed relative to each other; an evacuating step of sliding the formed second component part in a direction intersecting with a direction of sliding of the first mold relative to the second mold and with a direction of the opening and the closing the first and the second mold; a contacting step of sliding the first mold relative to the second mold and bringing the formed second component part into contact with the molded first component part; and a second molding step of performing injection molding to join the first component part and the second component part with the first and the second mold closed relative to each other.

According to the above-mentioned structure, in the liquid supply member manufacturing method, it is possible to suppress an increase in the size of a mold or a molding machine even in a molding process using a mold in which a contact portion between two components is located at a deep position in one of the two components.

Further features of the present invention will become apparent from the following description of exemplary embodiments (with reference to the attached drawings).

BRIEF DESCRIPTION OF THE DRAWINGS

FIGS. 6A to 6C are diagrams illustrating the molding positions and shape pieces of the liquid supply member and a liquid chamber cover member H121 in the mold according to the embodiment of the invention;

FIGS. 7A to 7C are diagrams illustrating the operation of the mold according to the embodiment of the invention;

DESCRIPTION OF THE EMBODIMENTS

Hereinafter, embodiments of the present invention will be described in detail with reference to the drawings.

Figure 1A:
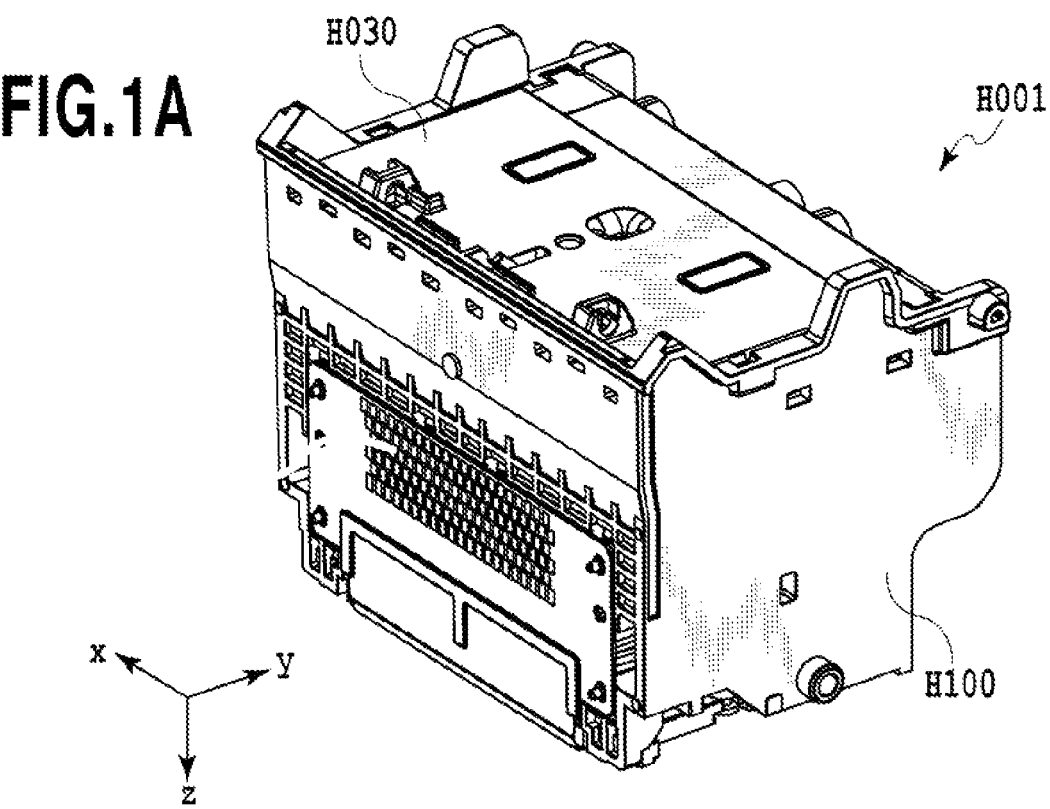
FIGS. 1A and 1B are perspective views illustrating a print head used in an inkjet printing apparatus which is an embodiment of a liquid ejection apparatus according to the invention.
Figure 1B:
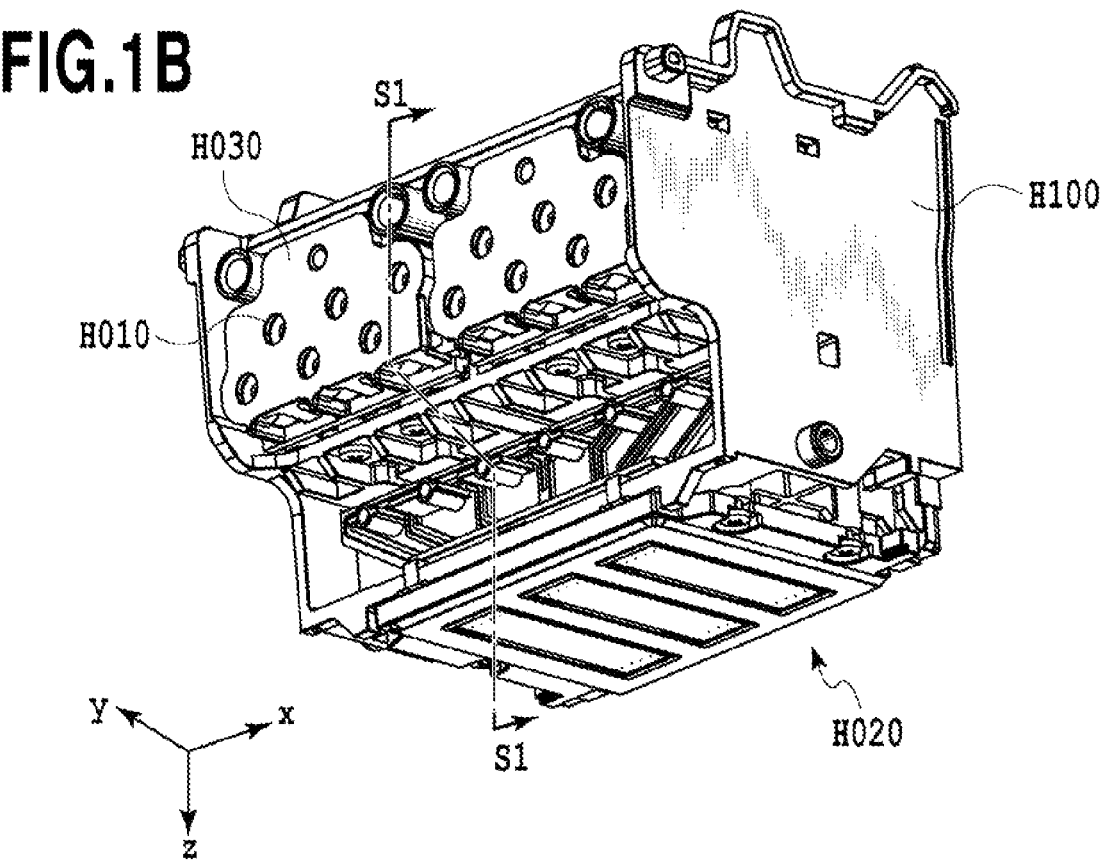

FIGS. 1A and 1B are perspective views illustrating a print head used in an inkjet printing apparatus which is an embodiment of a liquid ejection apparatus according to the invention, as viewed from different angles. In FIGS. 1A and 1B, a print head H001 includes a sub-tank H030 which is provided in an upper part in FIGS. 1A and 1B and into which a liquid supplied from a container (not illustrated) that stores ink as the liquid is introduced through, for example, a tube (not illustrated) connected to a liquid inlet H010. In addition, the print head H001 includes a printing element unit H020 which ejects the liquid onto a print medium and is provided on a surface facing downward in FIGS. 1A and 1B. The print head H001 further includes a liquid supply member H100 which is connected to the sub-tank H030 and the printing element unit H020 and forms a liquid supply path.

Figure 2:
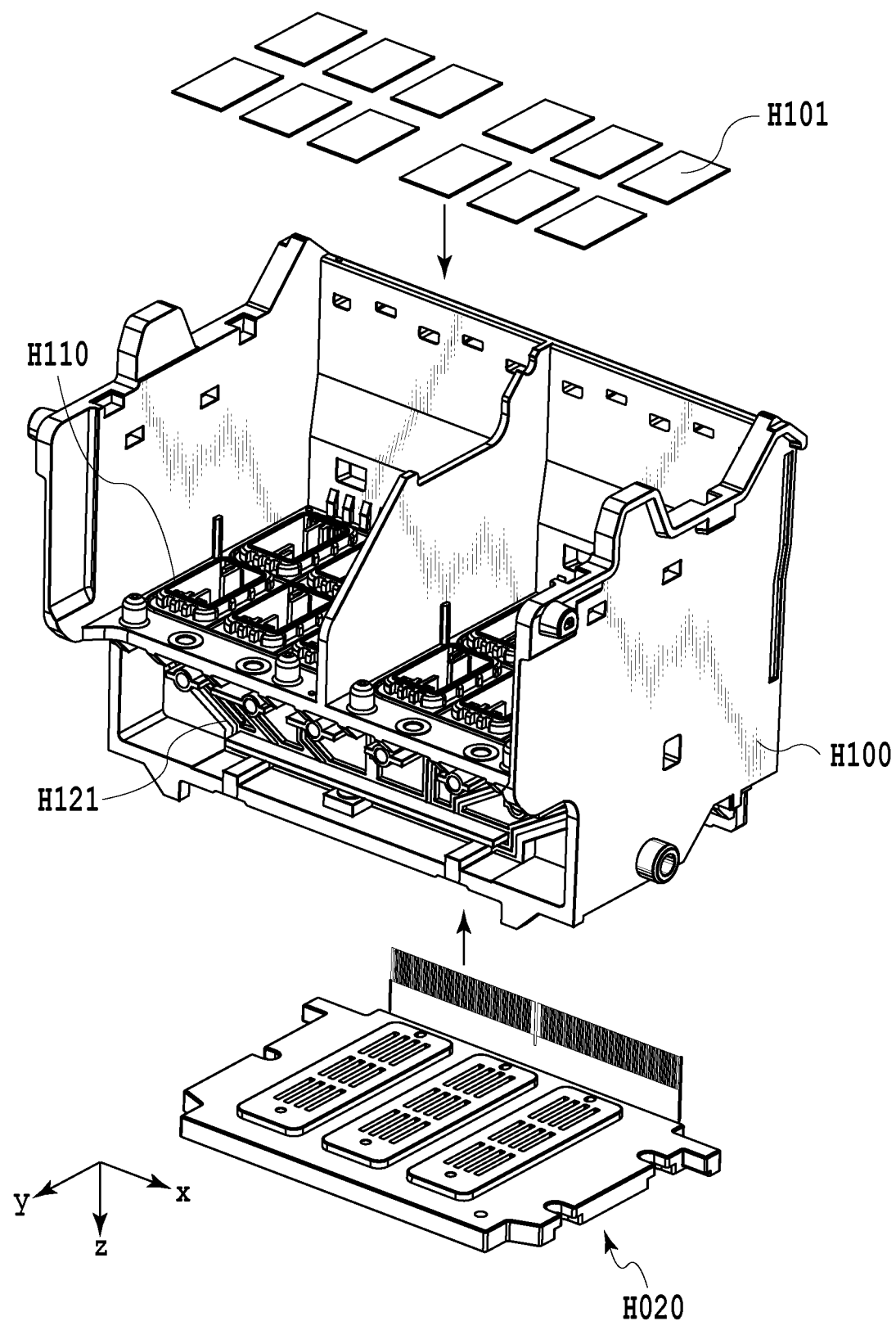
FIG. 2 is an exploded perspective view illustrating the detailed structure of a liquid supply member illustrated in FIGS. 1A and 1B.

FIG. 2 is an exploded perspective view illustrating the detailed structure of the liquid supply member H100. The liquid supply path in the liquid supply member H100 includes a filter H101 which is provided in a portion connected to the sub-tank H030 and removes foreign materials in the liquid introduced from the sub-tank. In the liquid supply path, a liquid chamber (flow path) H110 which temporarily contains the liquid is provided on the downstream side of the filter H101. In addition, the printing element unit H020 is connected to the downstream side of the liquid supply path.

Figure 3:
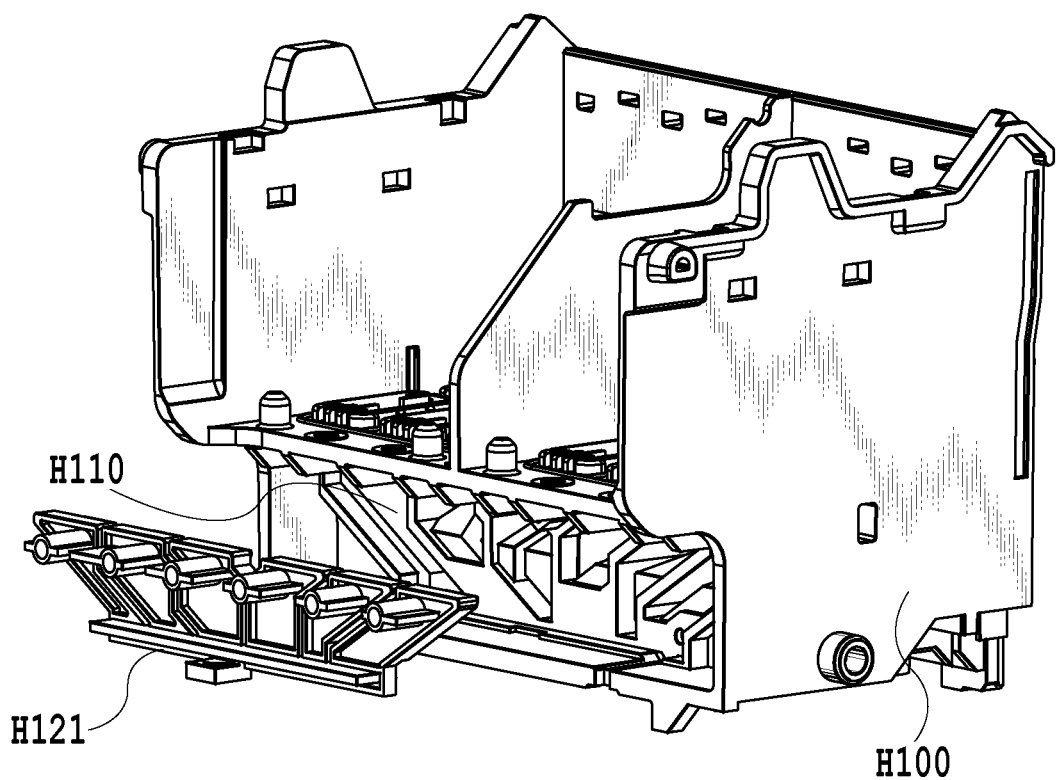
FIG. 3 is an exploded perspective view illustrating members forming a liquid chamber in the liquid supply member illustrated in FIGS. 1A and 1B.

As illustrated in FIG. 3, the liquid chamber H110 has an opening which is a connection portion with the filter H101 and an opening which is a connection portion with the printing element unit H020. An opening which is positioned in a direction different from the directions in which the above two openings are formed is closed by a liquid chamber cover member H121.

Figure 4A:
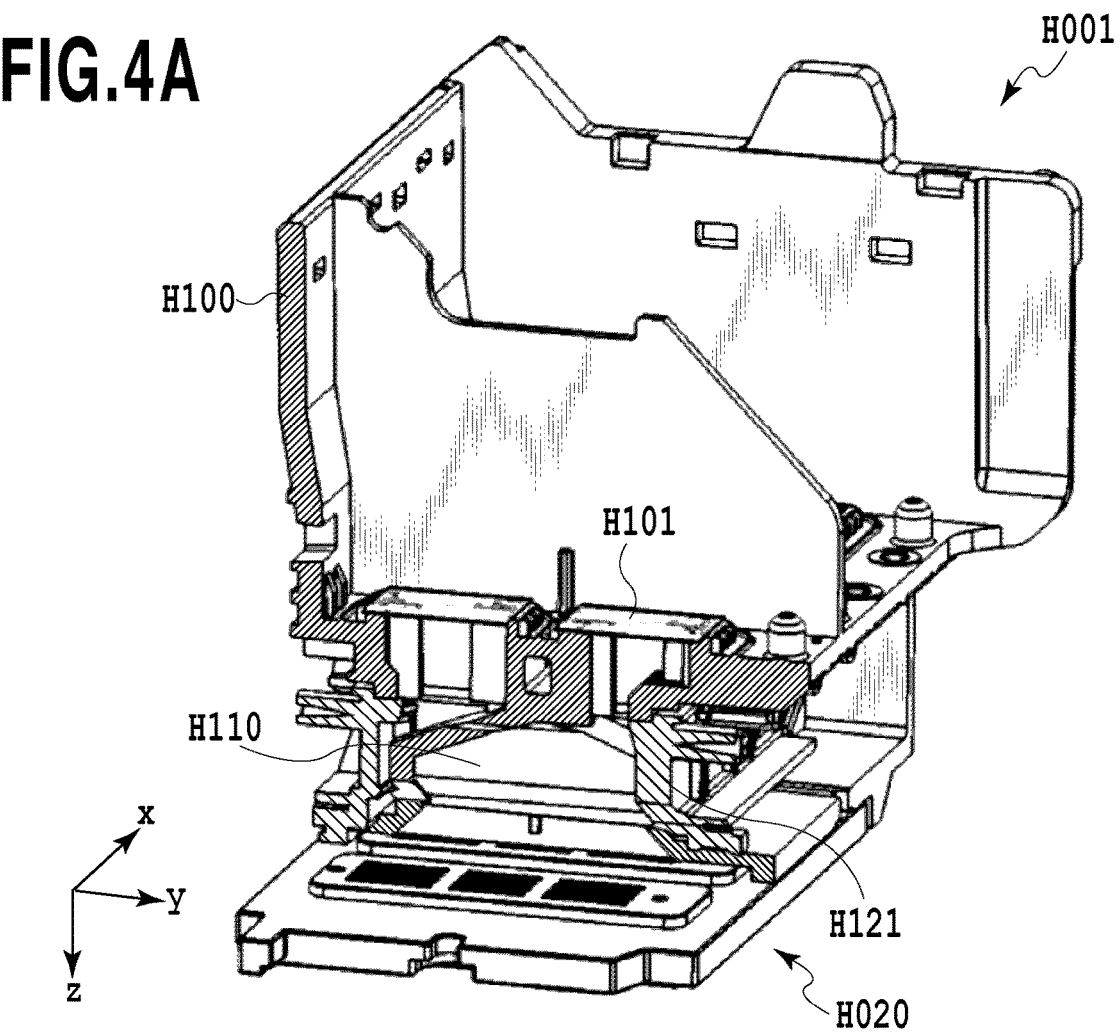
FIGS. 4A and 4B are a cross-sectional view and an enlarged view illustrating the structure of the liquid chamber in the liquid supply member illustrated in FIGS. 1A and 1B.
Figure 4B:
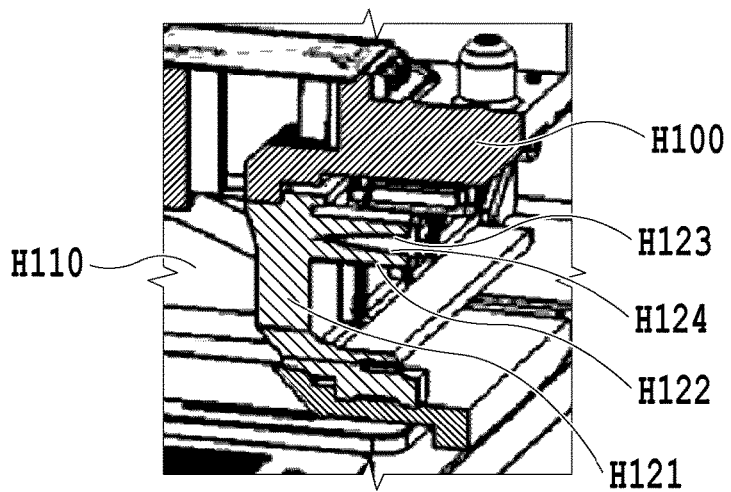

FIGS. 4A and 4B are a cross-sectional view and an enlarged view illustrating the structure of the liquid chamber H110 in the liquid supply member H100, respectively. FIG. 4A illustrates a cross section taken along the line S1-S1 of FIG. 1B. A liquid, such as ink, is introduced from the sub-tank H030 (not illustrated) through the filter H101 connected to the sub-tank H030 and is temporarily contained in the liquid chamber H110. The contained liquid is supplied to the printing element unit H020 by an ejection operation in the printing element unit H020.

In this embodiment, the liquid supply member H100 forming the liquid chamber H110 is manufactured as a resin mold component by injection molding. In the injection molding, as illustrated in FIG. 4A, in the case that the positions or shapes of the opening on the side of the filter H101 and the opening on the side of the printing element unit H020 are different from each other and two openings are formed by combinations of complicated sides, an opening is further provided on another side. Then, after the liquid chamber H110 is formed by injection molding, the opening is closed by the liquid chamber cover member H121 which is another member. As such, in this embodiment, when the liquid supply member H100 is formed by injection molding, two members, that is, the liquid supply member H100 (a portion other than the liquid chamber cover member H121) and the liquid chamber cover member H121 are molded and come into contact with each other. Then, since the liquid chamber cover member H121 is provided in one opening portion of the liquid chamber H110 in the liquid supply member H100, it is formed in a deep portion of the structure of the liquid supply member H100 in the injection molding.

Next, a method for manufacturing the liquid supply member H100 using the injection molding according to an embodiment of the invention will be described.

Figure 5:
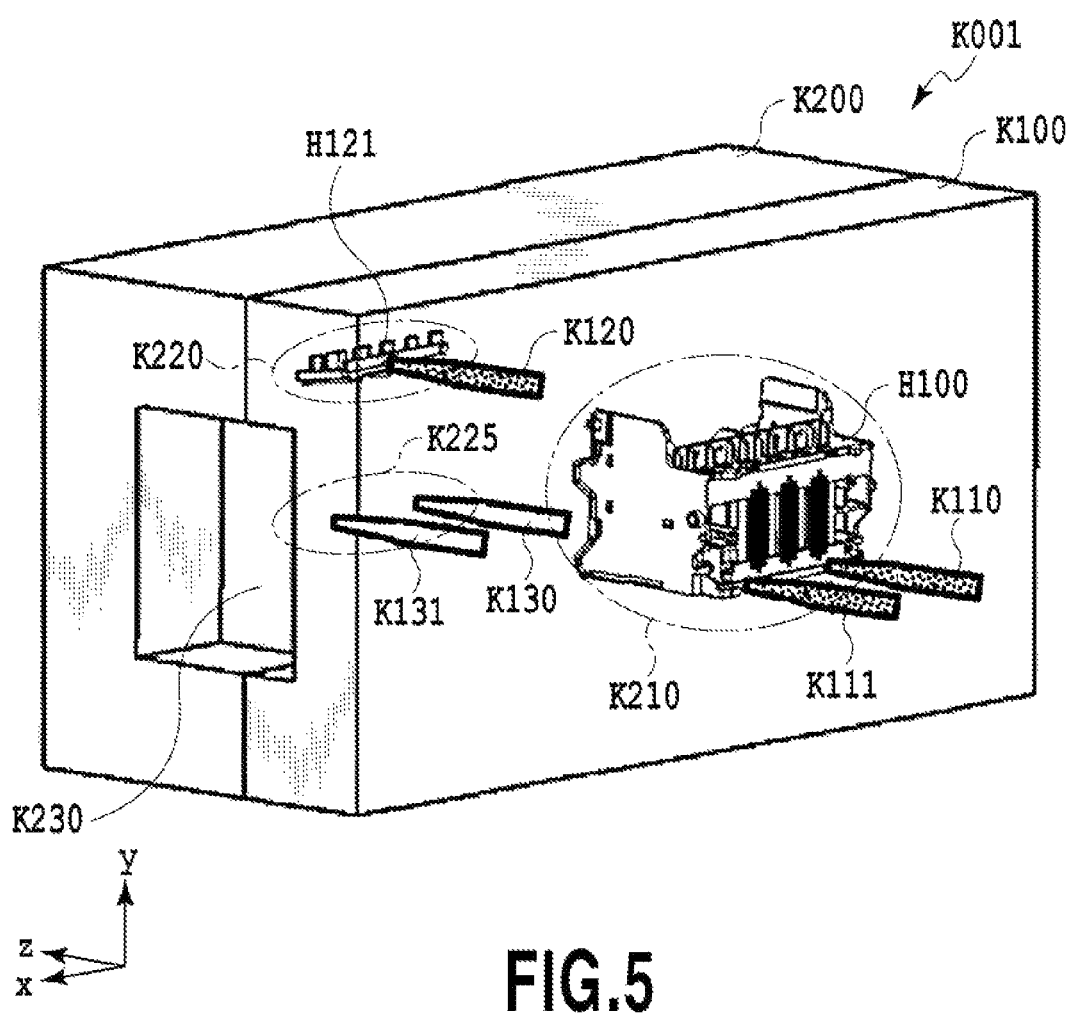
FIG. 5 is a perspective view illustrating a mold according to an embodiment of the invention.

FIG. 5 is a perspective view illustrating a mold according to an embodiment of the invention. A mold K001 of this embodiment includes a stationary mold K100 and a movable mold K200. The movable mold K200 is provided with a die slide K230. The stationary mold K100 and the movable mold K200 are configured so as to be opened and closed for mold opening and mold clamping. The movable mold K200 is configured so as to slide relative to the stationary mold K100. In the mold K001, a shape piece for molding the liquid supply member H100 and a shape pieces for molding the liquid chamber cover member H121 are arranged in the stationary mold K100 or the movable mold K200. In FIG. 5, reference numerals K110, K111, K120, K130, and K131 indicate valve gates for injecting a resin.

FIGS. 6A to 6C are diagrams illustrating the molding positions and shape pieces of the liquid supply member H100 and the liquid chamber cover member H121 in the mold. FIG. 6A is a diagram as viewed along a z direction in FIG. 5 and illustrates the stationary mold K100 in a see-through manner for ease of understanding of the inside of the mold. FIG. 6B is a diagram illustrating a cross section at a first molding position K210 taken along the line S3-S3 of FIG. 6A, and FIG. 6C is a diagram illustrating a cross section at a second molding position K220 and a third molding position K225 taken along the line S4-S4. FIGS. 6B and 6C illustrate the cross-sectional structures of the valve gates at each molding position.

In FIGS. 6A to 6C, the mold K001 includes the first molding position K210 at which the liquid supply member H100 is molded, the second molding position K220 at which the liquid chamber cover member H121 is molded, and the third molding position K225 at which the members are contacted and joined with each other. The valve gate K110, K111, K120, K130, or K131 for injecting a molding material is provided at each molding position. The shape piece of the liquid supply member H100 molded at the first molding position K210 is made by the movable mold K200 and the stationary mold K100. In addition, the shape piece of the liquid chamber cover member H121 molded at the second molding position K220 is made by a part piece K222 and a part slide piece K221.

FIGS. 7A to 7C and FIGS. 8A to 8C are diagrams illustrating the operation of the mold according to an embodiment of the invention and sequentially illustrate the operation of the mold according to this embodiment for one cycle. In the drawings, the stationary mold is not illustrated for simplicity of illustration and explanation.

In the process illustrated in FIG. 7A, with the stationary mold (not illustrated) and the movable mold K200 clamped, the liquid supply member H100 and the liquid chamber cover member H121 are formed at the first molding position K210 and the second molding position K220 by injection molding, respectively (primary molding). Two valve gates K110 and K111 for injection are provided at the molding position of the liquid supply member H100 and one valve gate K120 is provided at the molding position of the liquid chamber cover member H121. A portion other than the liquid chamber cover member H121, which is a first component of the liquid supply member H100, and the liquid chamber cover member H121, which is a second component other than the first component in the liquid supply member, are formed at different positions by injection molding. After molding is performed by this process, the mold is opened.

Then, in the process illustrated in FIG. 7B, with the molded liquid chamber cover member H121 held by the part slide piece K221, the part slide piece K221 is slid in the direction of an arrow A2 in FIG. 7B by a part slide mechanism (not illustrated) having a driving mechanism different from a mold opening and clamping mechanism. That is, the part slide piece is slid in the direction of the arrow A2 which intersects (in this embodiment, the direction perpendicular to) a direction in which the mold K100 and the mold K200 are opened and a die slide direction which will be described below. This slide allows the molded liquid chamber cover member H121 to be evacuated from the path of die sliding performed in the subsequent process. As described above, the liquid chamber cover member H121 is provided in a relatively deep portion of the structure of the liquid supply member H100. In the molding method according to this embodiment, the liquid chamber cover member H121 is not evacuated by an operation of opening the movable mold and the stationary mold, but is evacuated by sliding in the direction of the arrow A2. In this way, it is not necessary to increase the stroke of the operation of opening the movable mold and the stationary mold.

Here, in order to move out the molded liquid chamber cover member H121 with the sliding of the part slide piece K221, the force of the part slide piece K221 holding the surface of the liquid chamber cover member H121 which faces the part slide piece K221 needs to be stronger than the force of the part piece K222 holding the opposite surface of the liquid chamber cover member H121. Therefore, a plurality of sleeve structures H122 (FIG. 4B) are provided on the surface of the liquid chamber cover member H121 which faces the part slide piece K221 in order to increase the holding force. However, when the holding force is too strong, it is difficult to perform demolding after secondary molding. As a result, there is the risk of a finished product being damaged. For this reason, the inside of the sleeve structure (convex portion) H122 has a concave and conic shape H123 (FIG. 4B) in which a peripheral surface forms a taper H124 (FIG. 4B) in order to obtain strong front and rear holding forces and a high demolding performance. A mold structure forming the taper H124 is an insert pin structure such that a material of which the holding force is to be arbitrarily adjusted according to the material used and the structure of surrounding products can be arbitrarily changed.

In the next process illustrated in FIG. 7C, with the part slide piece K221 evacuated, the die slide K230 provided in the movable mold K200 is moved in the direction of an arrow A3 in FIG. 7C (die sliding is relatively performed). In this case, the molded liquid supply member H100 that is held by the die slide K230 is moved in the direction of the arrow A3 to a position where it can come into contact with the liquid chamber cover member H121. Similarly to the part slide mechanism, the die slide K230 is driven by a driving mechanism different from the mold opening and closing mechanism.

Figure 8A:
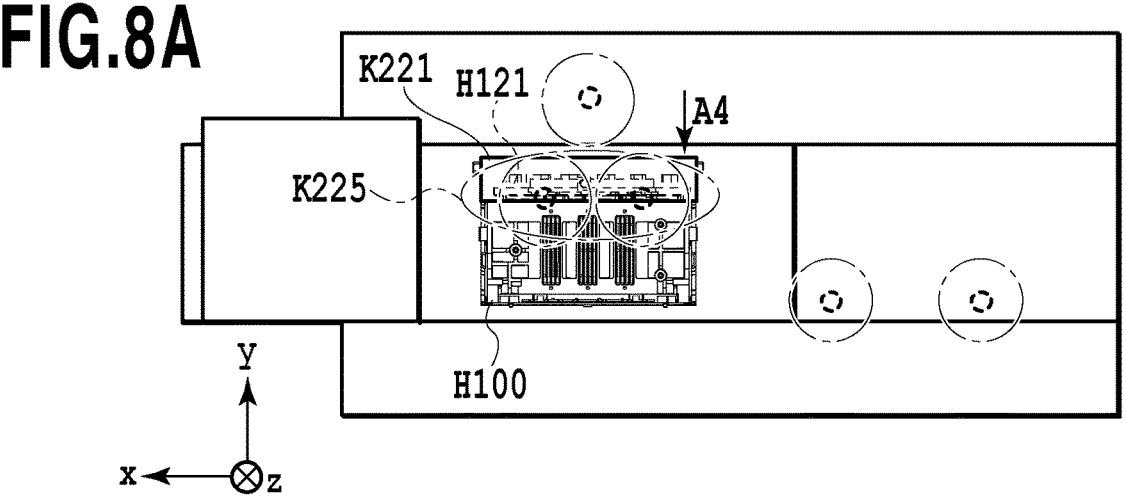
FIGS. 8A to 8C are diagrams illustrating the operation of the mold according to the embodiment of the invention.

Then, in the process illustrated in FIG. 8A, the molded liquid chamber cover member H121 held by the part slide piece K221 is moved to the third molding position K225 in the direction of an arrows A4 in FIG. 8A by a return operation of the part slide mechanism so as to come into contact with the opening portion of the liquid chamber H110 in the liquid supply member H100. The valve gates K130 and K131 for injecting a material are also provided at the third molding position K225.

Here, the valve gates provided in the mold according to this embodiment have the same structure and have the cross-sectional size represented by a dashed line in the drawings. Therefore, when the valve gates are arranged so as to be adjacent to each other, they need to be arranged at a pitch that is equal to or greater than the diameter of the circle. The valve gate for molding the liquid chamber cover member H121 and the valve gates K130 and K131 provided at the third molding position are arranged so as not to be adjacent to each other since they need to be arranged at a pitch that is equal to or greater than the diameter of the circle in the cross-sectional view of the valve gates. Therefore, in this embodiment, the molding position of the liquid chamber cover member H121 is different from the third molding position K225. That is, the part slide mechanism has three stop positions, that is, the second molding position K220 where the liquid chamber cover member H121 is molded, an evacuation position for avoiding the die slide, and the position where the liquid supply member H100 is contacted and joined with the liquid chamber cover member H121.

Then, the mold is clamped with the liquid chamber cover member H121 coming into contact with the opening portion of the liquid chamber H110 in the liquid supply member H100 at the third molding position K225.

Figure 8B:
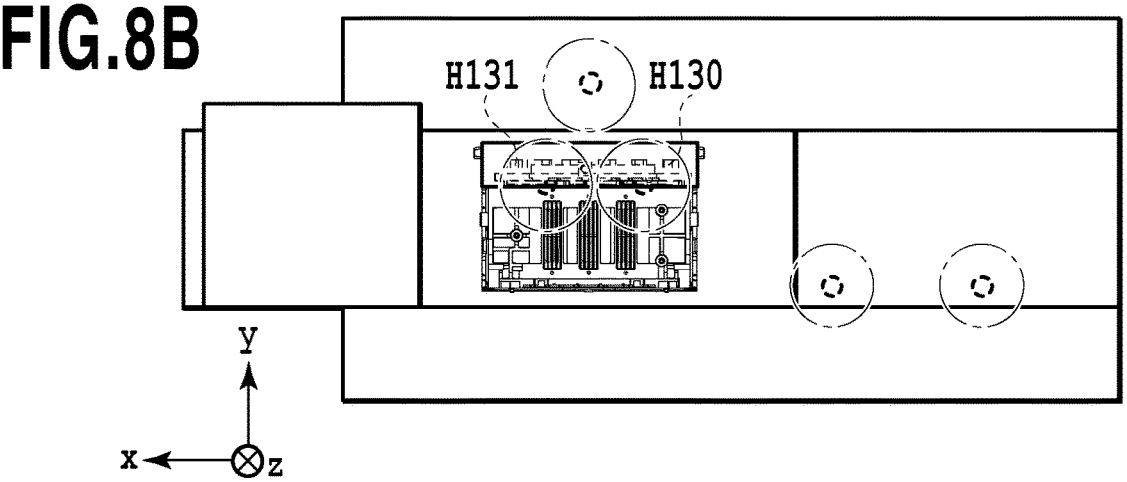

Then, in the process illustrated in FIG. 8B, the contact portion between the liquid chamber cover member H121 and the opening portion of the liquid chamber H110 in the liquid supply member H100 is filled with a material which is compatible with the liquid supply member H100 and the liquid chamber cover member H121, without any space therebetween, such that the liquid supply member H100 and the liquid chamber cover member H121 are hermetically joined with each other. The sealing material includes filler. In the liquid chamber H110, a hollow portion with a sealed structure is formed by filling with the material except for the opening which is connected to the sub-tank H030 and is on the side of the filter H101 and the opening on the side of the printing element unit H020.

Figure 8C:
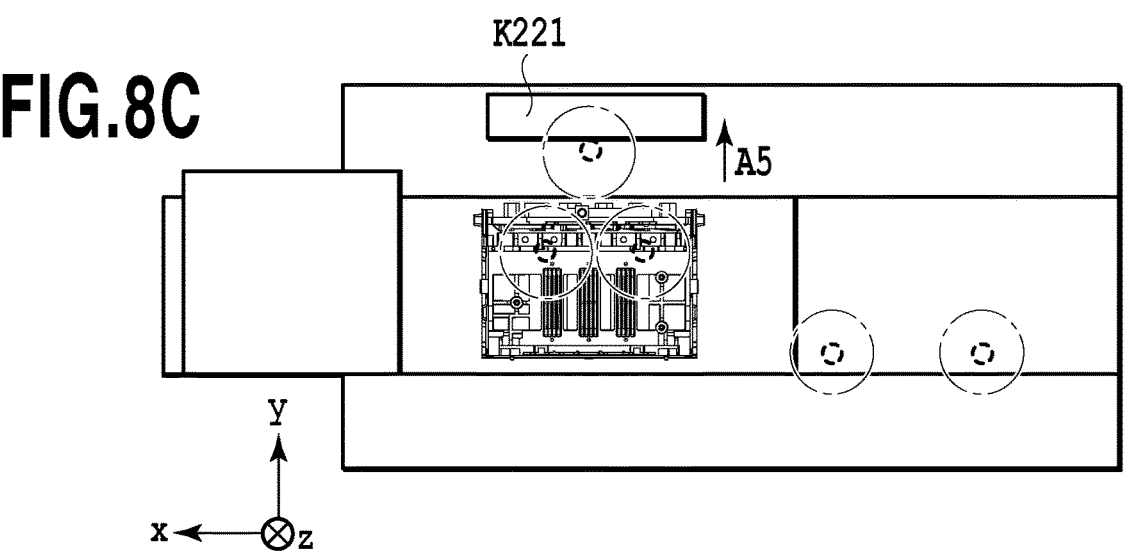

Finally, in the process illustrated in FIG. 8C, the mold K001 is opened and the part slide piece K221 is moved in the direction of an arrow A5 in FIG. 8C. In addition, the liquid supply member H100 in which the sealed hollow structure has been completed is pushed out and is taken out of the mold K001.

The use of the mold K001 having the structure that performs the above-mentioned operation makes it possible to suppress an increase in the opening and closing stroke of the stationary mold K100 and the movable mold K200. As a result, it is possible to prevent an increase in the sizes of a mold and a molding machine and thus to manufacture an inkjet print head with a small size at a low cost.

Figure 9A:
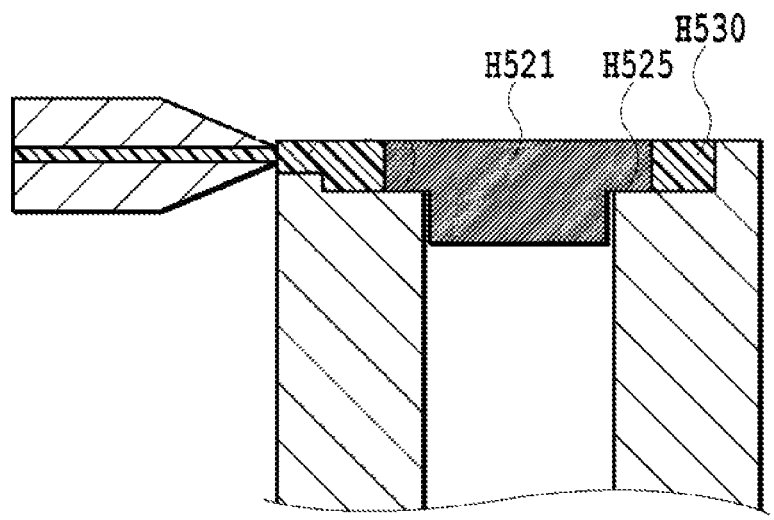
FIGS. 9A and 9B are cross-sectional views schematically illustrating the arrangement position of a valve gate for injecting a molding material for sealing a contact portion between two components.
Figure 9B:
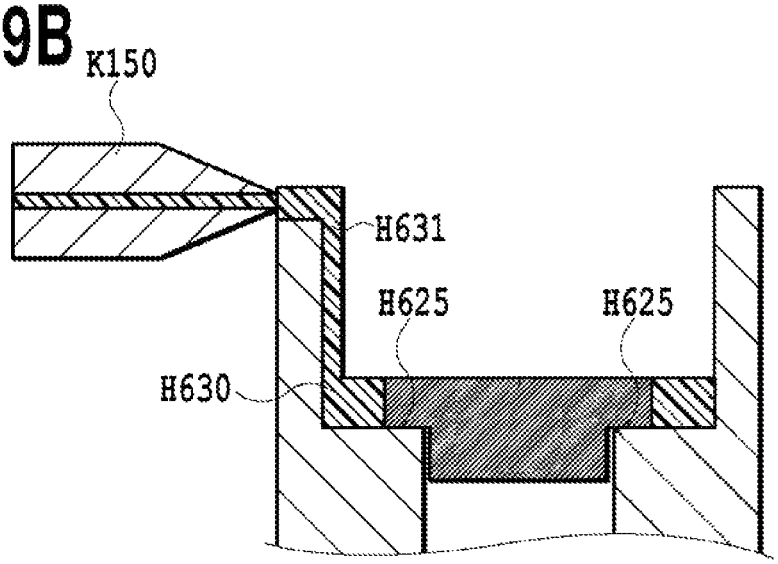

In this embodiment, when a contact portion between two components is located at a deep position in one of the components as compared to the case illustrated in FIG. 9A, the arrangement position of a valve gate for injecting a molding material for sealing the contact portion between the two components is far away from the contact position between the two components. As illustrated in FIG. 9B, a cylindrical gate runner H631 is provided from an outermost portion of a product after the two components are contacted and joined with each other to a contact portion H625 between the two components and a molding material is introduced from the gate valve K150. This gate runner structure makes it possible to improve flexibility in the position of the contact portion between the two components and flexibility in the structure of a mold and layout, that is, to prevent an increase in the size of a mold and the size of a molding machine.

OTHER EMBODIMENTS

Figure 10A:
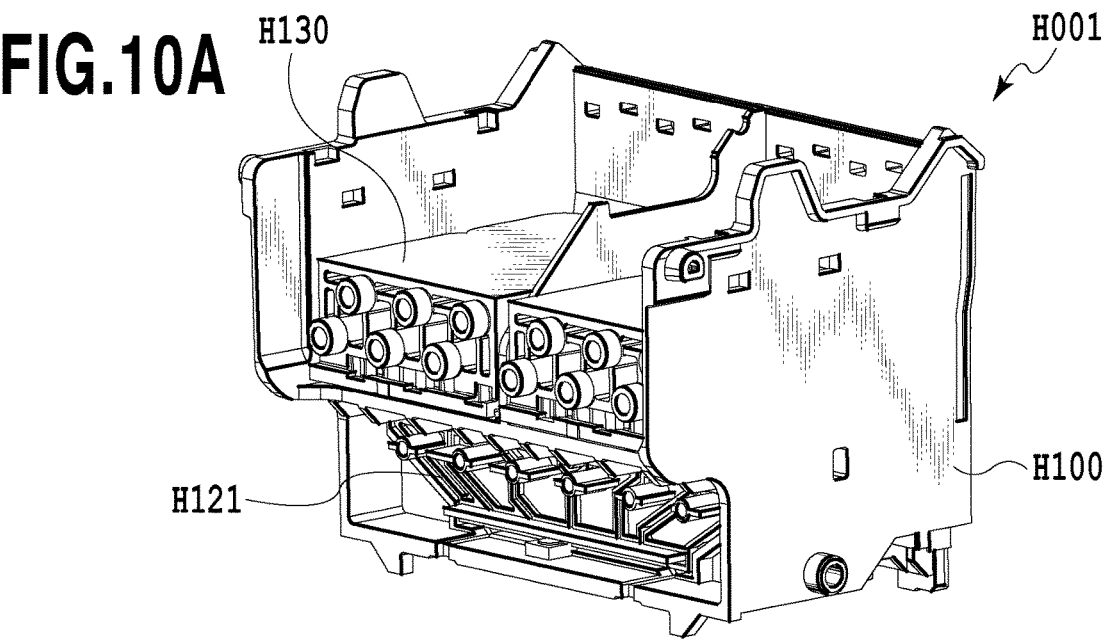
FIGS. 10A and 10B are perspective views illustrating a liquid supply member according to another embodiment of the invention.
Figure 10B:
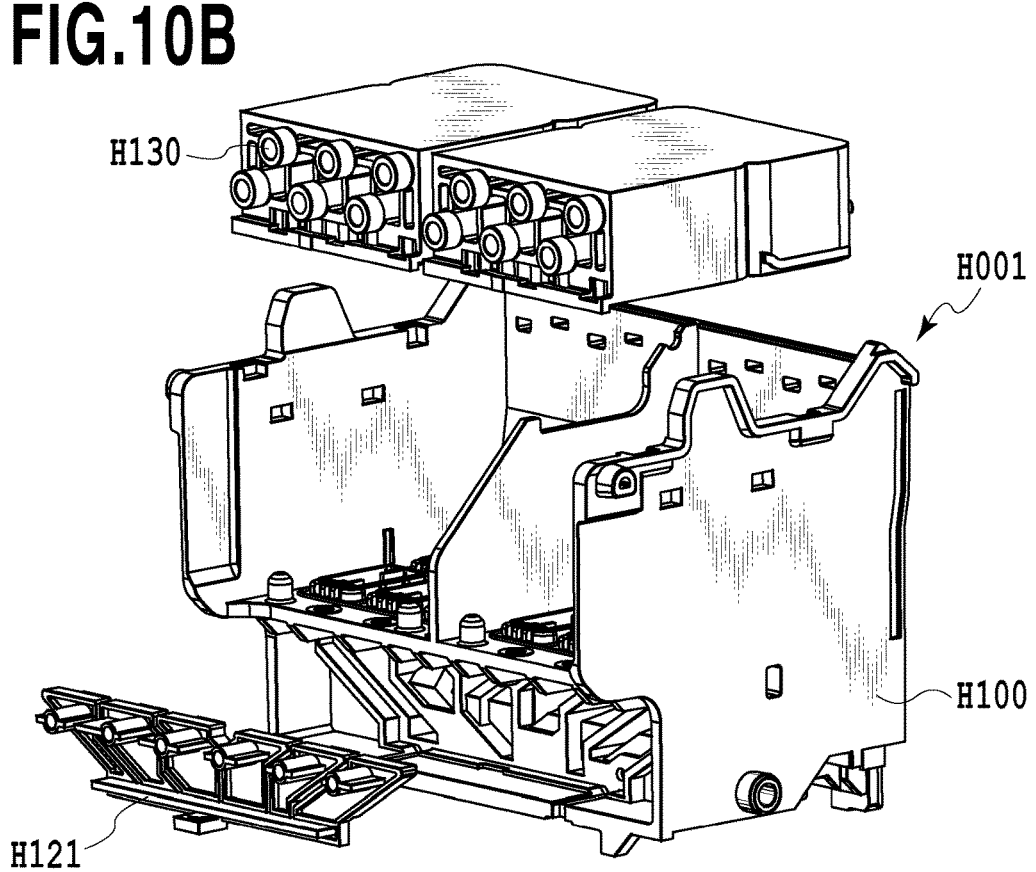
Figure 11A:
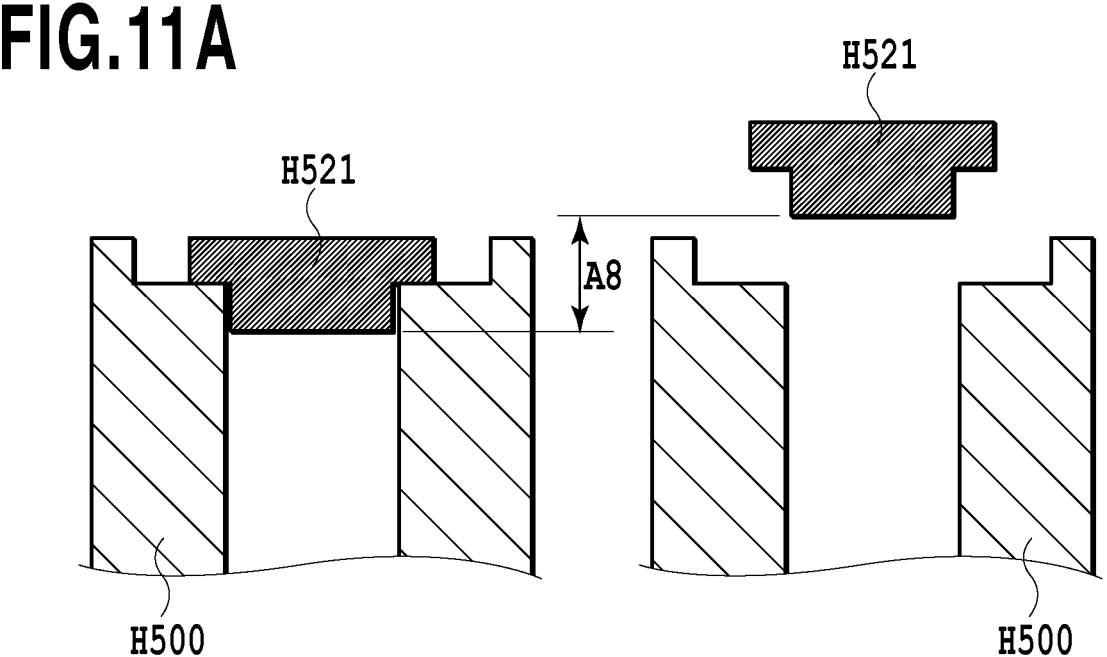
FIGS. 11A and 11B are diagrams illustrating a case in which two components come into contact with each other at a shallow position and a case in which the two components come into contact with each other at a deep position during the molding of the two components using a mold, respectively.
Figure 11B:
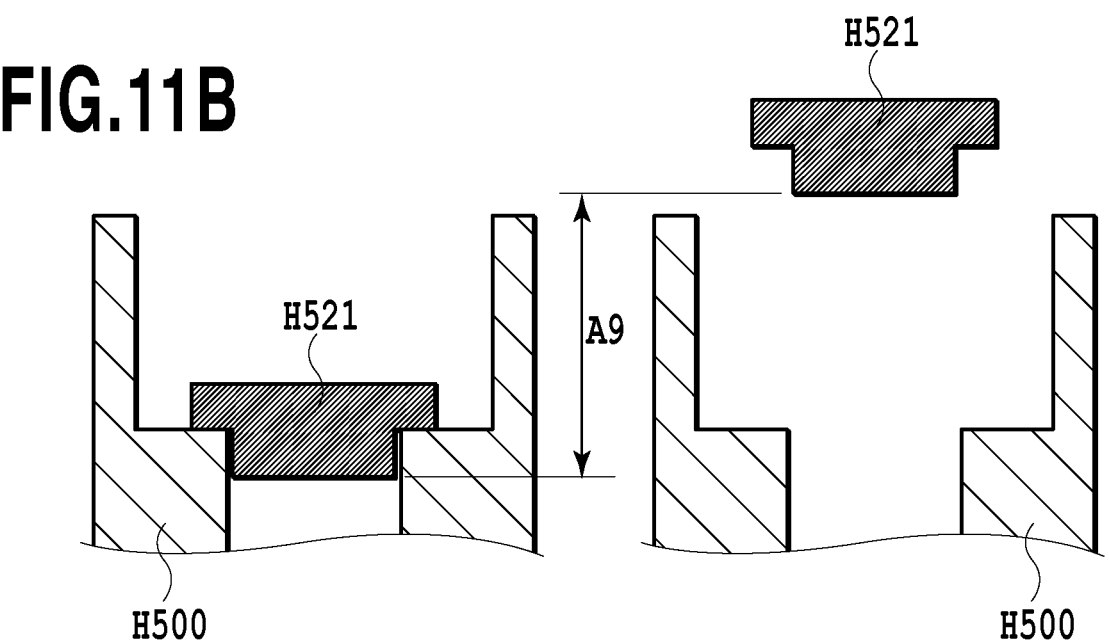

FIGS. 10A and 10B are diagrams illustrating an inkjet print head H001 into which a sub-tank H130 having a function of connecting a supply tube (not illustrated) that supplies a liquid, such as ink, is incorporated, with a liquid supply member H100 and a liquid chamber cover member H121 joined with each other. As such, when the mold structure according to the invention is applied, it is possible to complete components in the same mold through a series of operations even if the number of components increases.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-105091 filed May 25, 2015, which is hereby incorporated by reference wherein in its entirety.

What is claimed is:

1. A manufacturing method for molding a liquid supply member by using a first mold and a second mold which are capable of being opened and closed relative to each other and in which the first mold is capable of being slid relatively to the second mold, the method comprising:
   a first molding step of performing injection molding to form a first component part of the liquid supply member and a second component part of the liquid supply member other than the first component part at different positions from each other, with the first and the second molds closed relative to each other;
   a step of relatively moving the first mold and the second mold in a first direction to open the mold;
   a step of retracting the second component part in a second direction;
   a step of sliding the first mold with respect to the second mold in a third direction;
   an abutting step of sliding the second component part in a fourth direction, which is opposite to the second direction, and bringing the second component part and the first component part into contact with each other; and
   a second molding step of performing injection molding to join the first component part and the second component part with the first and the second molds closed relative to each other,
   wherein the first direction, the second direction, and the third direction are orthogonal to each other.

2. The manufacturing method according to claim 1, wherein the second component part is joined to the first component part at a position inside the first component part in the direction of the opening and the closing the first and the second molds.

3. The manufacturing method according to claim 1, wherein the second component part is joined to the first component part to form a hollow portion in the liquid supply member.

4. The manufacturing method according to claim 1, wherein an injection molding material in the second molding step is a same material as a material of the first and second component parts.

5. The manufacturing method according to claim 1, wherein an injection molding material in the second molding step includes filler.

6. The manufacturing method according to claim 1, wherein the second component part includes a plurality of convex portions (H122), on an opposite surface to a surface of the second component part that is brought into contact with the first component part.

7. The manufacturing method according to claim 6, wherein a conical recess is formed on a top surface of the convex portion.

8. The manufacturing method according to claim 1, wherein a position at which the second component part is formed in the first molding step, a position into which the second component part is slid in the evacuating step, and a position at which the second component part is joined to the first component part in the second molding step are different from each other.

9. The manufacturing method according to claim 1, wherein the second molding step performing filling of an injection molding material through a cylindrical portion made with the first component part and the second mold.

10. The manufacturing method according to claim 1, wherein the first component part and the second component part are joined to form a flow path for supplying ink to a printing element part for ejecting ink.

* * * * *